(12) United States Patent
Lee

(10) Patent No.: US 11,376,539 B2
(45) Date of Patent: Jul. 5, 2022

(54) MULTILAYER FILM FOR AIR PURIFICATION AND METHOD FOR MANUFACTURING SAME

(71) Applicant: BIOTERRA. INC., Hwaseong (KR)

(72) Inventor: Kyung Sook Lee, Seongnam (KR)

(73) Assignee: BIOTERRA. INC., Hwaseong (KR)

( * ) Notice: Subject to any disclaimer, the term of this patent is extended or adjusted under 35 U.S.C. 154(b) by 388 days.

(21) Appl. No.: 16/620,436

(22) PCT Filed: Jun. 7, 2018

(86) PCT No.: PCT/KR2018/006441
§ 371 (c)(1),
(2) Date: Dec. 6, 2019

(87) PCT Pub. No.: WO2018/226029
PCT Pub. Date: Dec. 13, 2018

(65) Prior Publication Data
US 2020/0139287 A1    May 7, 2020

(30) Foreign Application Priority Data

Jun. 8, 2017    (KR) .................. 10-2017-0071711

(51) Int. Cl.
*B01D 46/00* (2022.01)
*B01D 53/04* (2006.01)
(Continued)

(52) U.S. Cl.
CPC ..... *B01D 46/0036* (2013.01); *B01D 46/0001* (2013.01); *B01D 53/04* (2013.01); *B32B 5/16* (2013.01); *B32B 27/14* (2013.01); *B32B 27/32* (2013.01); *B32B 37/24* (2013.01); *B32B 38/0008* (2013.01); *A62B 23/025* (2013.01);
(Continued)

(58) Field of Classification Search
CPC . B01D 46/0036; B01D 46/0001; B01D 53/04
See application file for complete search history.

(56) References Cited

U.S. PATENT DOCUMENTS

2007/0044801 A1    3/2007    Mathis et al.

FOREIGN PATENT DOCUMENTS

| JP | H10108915 A | 4/1998 |
| JP | H11290624 A | 10/1999 |

(Continued)

OTHER PUBLICATIONS

Search Report dated Sep. 13, 2018 for PCT Application No. PCT/KR2018/006441.

*Primary Examiner* — Robert A Hopkins

(57) ABSTRACT

The present invention relates to a multilayer film for air purification and a method for manufacturing the same and, more particularly, to a multilayer film for air purification having a thin and uniform shape, thereby exhibiting a high degree of utility as a mask and an air purification filter, as well as having an excellent air purification function, and a method for manufacturing the same. The objective of the present invention is to provide a multilayer film for air purification and a method for manufacturing the multilayer film for air purification, which comprises yellow ocher-activated carbon composite particles capable of removing fine dust, bacteria, odor, VOC, etc. present in the air.

10 Claims, 4 Drawing Sheets

(51) Int. Cl.
  *B32B 5/16*    (2006.01)
  *B32B 27/14*   (2006.01)
  *B32B 27/32*   (2006.01)
  *B32B 37/24*   (2006.01)
  *B32B 38/00*   (2006.01)
  *A62B 23/02*   (2006.01)

(52) U.S. Cl.
  CPC .... *B01D 2253/102* (2013.01); *B01D 2253/11* (2013.01); *B01D 2253/25* (2013.01); *B01D 2257/708* (2013.01); *B01D 2257/90* (2013.01); *B01D 2257/91* (2013.01); *B01D 2275/10* (2013.01); *B01D 2279/40* (2013.01); *B32B 2037/243* (2013.01); *B32B 2264/108* (2013.01); *B32B 2307/724* (2013.01); *B32B 2307/758* (2013.01); *B32B 2313/04* (2013.01); *B32B 2315/16* (2013.01); *B32B 2323/04* (2013.01)

(56) References Cited

FOREIGN PATENT DOCUMENTS

| | | | |
|---|---|---|---|
| JP | 3099919 U | 4/2004 | |
| JP | 2006320491 A | 11/2006 | |
| JP | 2009505788 A | 2/2009 | |
| KR | 20130022773 A | 3/2013 | |
| KR | 20160105025 A | 9/2016 | |
| KR | 20160111740 A | 9/2016 | |
| KR | 2018113233 A * | 10/2018 | ......... B01D 46/0002 |
| KR | 2061450 B1 * | 12/2019 | ........... A45D 44/002 |
| WO | WO2016148348 A1 | 9/2016 | |

\* cited by examiner

MULTILAYER FILM FOR AIR PURIFICATION AND METHOD FOR MANUFACTURING SAME

CROSS-REFERENCE TO RELATED APPLICATION

This application is a National Phase entry of International Application No. PCT/KR2018/006441, filed on Jun. 7, 2018, which claims priority to Korean Patent Application No. 10-2017-0071711, filed on Jun. 8, 2017, in the Korean Intellectual Property Office, the disclosure of which is incorporated herein by reference.

TECHNICAL FIELD

The present disclosure relates to a multilayer film for air purification and a method for manufacturing the same. More particularly, the present disclosure relates to a multilayer film for air purification and a method for manufacturing the same, which has not only an excellent air purification function but also a thin and uniform shape, and thus has high utility as a mask and an air purification filter.

BACKGROUND ART

Generally, air we breathe contains fine dust, bacteria, and the like, and spreads an odor. In particular, when yellow dust occurs, the air is polluted by a lot of sand, fine dust, and the like, which adversely affects a bronchus and the like of human. In addition, a volatile organic compound (VOC) collectively refers to substances, which have a high vapor pressure to be evaporated easily into the air, and cause a photochemical reaction under an action of sunlight when co-exist with nitrogen oxide in the air to generate photochemical oxidizing substances such as ozone, PAN, and the like, thereby causing photochemical smog. Since such volatile organic compounds are carcinogenic substances and are causes of air pollution and global warming, each country has policies for managing the volatile organic compounds to reduce emissions of the volatile organic compounds. In this connection, since organic solvent is in a liquid state, it is easy to manage emission of the organic solvent, but it is difficult to manage VOC gas because the VOC gas exists in a gaseous state.

In order to remove the fine dust, the bacteria, the odor, the VOC, and the like in the air or water, an air cleaner, a purifier, and the like are used. Activated carbon is the most widely used material for the air cleaner, the purifier, and the like.

The activated carbon has high absorption capacity for various foreign substances along with a far-infrared radiation effect due to a carbonized internal mesh structure. Therefore, the activated carbon has been widely used in various fields such as home and domestic air conditioners, a water purifier using a filter of reverse osmosis or hollow fiber membrane schemes, a deodorant, and the like. However, when internal pores of the activated carbon are saturated with pollutants, the activated carbon no longer functions as the filter, so that it is necessary to replace the activated carbon with new activated carbon periodically. Therefore, there has been a need for a technique for improving a lifetime of such activated carbon in terms of economy and environment.

In addition, masks for purifying breathing air from the polluted air are effective in removing some of pollution particles in the air, but a function of purifying toxic gas such as the VOCs and the like in the air and an ability to capture or decompose odor particles and the like are not very good, thus an actual air purification effect of masks is not enough.

DISCLOSURE

Technical Problem

A purpose of the present disclosure is to provide a multilayer film for air purification that contains yellow ocher-activated carbon composite particles that may remove fine dust, bacteria, odor, a VOC, and the like from air. In addition, another purpose of the present disclosure is to provide a method for manufacturing a multilayer film for air purification that contains yellow ocher-activated carbon composite particles.

Technical Solution

In one aspect, a multilayer film for air purification is provided. The multilayer film includes a first air permeable layer and a second air permeable layer, each having flexibility and having a net structure, respectively, and an air purification particle layer located between the first air permeable layer and the second air permeable layer, and containing yellow ocher-activated carbon composite particles having a larger average particle diameter than an average hole size of the first air permeable layer and the second air permeable layer, wherein at least portions of the first air permeable layer and the second air permeable layer are fused with each other.

In another aspect, a multilayer film for air purification is provided. The multilayer film includes a first air permeable layer and a second air permeable layer, each having flexibility and having a net structure, and an air purification particle layer located between the first air permeable layer and the second air permeable layer, and containing yellow ocher-activated carbon composite particles having a larger average particle diameter than an average hole size of the first air permeable layer and the second air permeable layer, wherein the air purification particle layer further includes a particle support layer having a plurality of particle receiving holes defined therein having a size larger than an average diameter of the yellow ocher-activated carbon composite particles, wherein at least some of the yellow ocher-activated carbon composite particles are located in the particle receiving holes, respectively, and wherein at least one selected from the first air permeable layer and the second air permeable layer is at least partially fused to the particle support layer.

In one implementation, at least one selected from the first air permeable layer and the second air permeable layer may be made of a material containing a thermoplastic polymer.

In one implementation, the yellow ocher-activated carbon composite particles may contain 5 to 15 parts by weight of plastic clay and 3 to 15 parts by weight of activated carbon mixed with each other, based on 100 parts by weight of yellow ocher, and wherein the yellow ocher-activated carbon composite particles may have a density of 5.1 to 7.4 g/cc because of not being subjected to a calcination process.

In one implementation, an average thickness of the multilayer film for the air purification may be 1 to 5 mm.

In one implementation, at least some of the yellow ocher-activated carbon composite particles may be attached to at least one selected from the first air permeable layer and the second air permeable layer.

In one implementation, the thermoplastic polymer may be polyethylene.

In still another aspect, a method for manufacturing a multilayer film for air purification is provided. The method includes preparing a first air permeable layer having flexibility and having a net structure, disposing a particle support layer having a net structure on the first air permeable layer, applying composite particles such that yellow ocher-activated carbon composite particles are contained in at least some of a plurality of holes included in the net structure of the particle support layer, disposing a second air permeable layer having flexibility and having a net structure on the composite particles, and after disposing the second air permeable layer, ultrasonically fusing at least some of the first air permeable layer, the second air permeable layer, and the particle support layer with each other, wherein the yellow ocher-activated carbon composite particles contain 5 to 15 parts by weight of plastic clay and 3 to 15 parts by weight of activated carbon mixed with each other, based on 100 parts by weight of yellow ocher, and wherein the yellow ocher-activated carbon composite particles have a density of 5.1 to 7.4 g/cc because of not being subjected to a calcination process.

In one implementation, at least one selected from the first air permeable layer, the second air permeable layer, and the particle support layer may be made of a material containing a thermoplastic polymer.

In yet another aspect, a mask for air purification including the multilayer film for the air purification is provided.

Advantageous Effects

The yellow ocher-activated carbon composite particles of the present disclosure are not calcinated, which results in existence of a large amount of microorganisms and porous structure. Therefore, not only an antibacterial function and a deodorizing function are excellent, but also a large amount of far-infrared rays are emitted. Therefore, when the yellow ocher-activated carbon composite particles are fused to a thermoplastic porous polymer layer and applied to a filter, a mask, or the like, in addition to fine particles, the fine dust, the bacteria, the odor, the VOC, and the like present in the air may be removed by the yellow ocher-activated carbon composite particles.

In particular, such harmful substances (fine dust, bacteria, odor, VOC, and the like) are removed, so that air pollution and global warming may be prevented. In addition, the yellow ocher-activated carbon composite particles of the present disclosure do not require any other energy to purify the air and do not cause secondary environmental pollution. Since the yellow ocher-activated carbon composite particles are not subjected to the calcination process, a manufacturing process of the yellow ocher-activated carbon composite particles becomes simple and a cost becomes low. In addition, the yellow ocher-activated carbon composite particles of the present disclosure may be recycled by grinding and reshaping.

MODE FOR INVENTION

Figure 1:
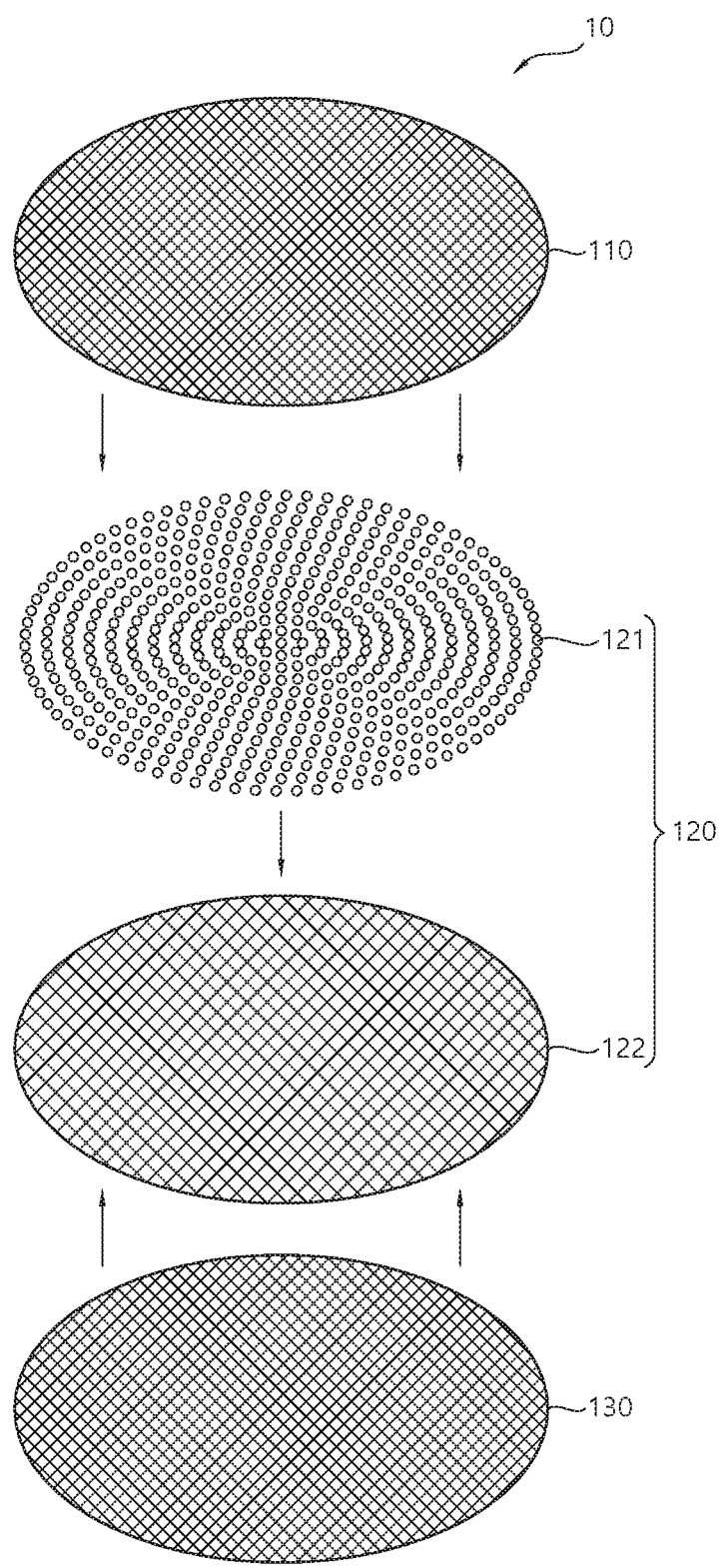
FIG. 1 is an exploded perspective view of a multilayer film for air purification according to an embodiment of the present disclosure.

A conventional yellow ocher molded body may have an excellent strength by being subjected to a calcination process (heating at 800 to 1300° C.) after a drying process. However, after the calcination process, a specific surface area of the molded body is reduced, and all of microorganisms, enzymes, and the like derived from the yellow ocher inside cannot withstand high temperatures and disappear. In addition, activated carbon has a very large specific surface area, and is excellent in removing the microorganisms, VOCs, and the like, and thus has been used in various air filtration apparatuses, polluted water purification apparatuses, and the like. However, when the activated carbon is used for a certain time, a purification ability thereof is greatly reduced, and it is difficult to recycle the activated carbon. Therefore, a constant purification performance may be obtained only by replacing the activated carbon with new activated carbon.

However, the present disclosure relates to yellow ocher-activated carbon composite particles and a multilayer film for air purification containing the same, which have an excellent strength through only the drying process after forming without the calcination process by mixing plastic clay and yellow ocher with each other, is able to remove harmful substances (odor, VOC, fine dust, bacteria, and the like), and maintains a purification performance for a long time compared to a general activated carbon filter.

The yellow ocher (Yellow Soil, Hwangto) in the present disclosure refers to weathered residual soil (weathered soil) that is formed by a rock subjected to chemical weathering (see J. Miner. Soc. Korea, 13, 147-163 (2000)). The yellow ocher is a kind of soil, and is a weathering product of the rock. Therefore, a color, a composition, a physicochemical property, and the like of the yellow ocher may vary depending on a type, a degree of weathering, and the like. For example, in a chemical composition of the yellow ocher, 45 to 55% by weight of silicon dioxide, 20 to 30% by weight of alumina, and 10 to 20% by weight of $Fe_2O_3$ are present as main components. 0 to 15% by weight of titanium dioxide, magnesium oxide, calcium oxide, sodium oxide, potassium oxide, and the like may be contained in the yellow ocher as trace components. However, this is merely an example, and the yellow ocher according to the present disclosure is not limited to the above content range.

The yellow ocher contains numerous minerals such as calcium carbonate, silica, alumina, iron, magnesium, sodium, potassium, and the like, various enzymes such as catalase, diphenoloxydiase, saccharase, protease, and the like, and various microorganisms such as *Bacillus* genus, *Pseudomonas* genus, *Nitrosomonas* genus, and the like. In this connection, the enzyme plays a role in detoxification, decomposition and purification, and the microorganism decomposes the VOC, and in particular, decomposes the odor into carbon dioxide and water.

The yellow ocher, used in the present disclosure, is a porous material, and has, for example, a honeycomb structure with a large surface area, in which numerous sections form a multilayer structure. It is known that a large amount of far-infrared rays of sunlight is absorbed into, stored in, and released from pores of the yellow ocher. In addition, the yellow ocher, which is the porous material, has an excellent ability to adsorb the fine dust, the bacteria, the odor, and the like because of a high specific surface area thereof.

The yellow ocher-activated carbon composite particles of the present disclosure include 100 parts by weight of the yellow ocher, 5 to 15 parts by weight of the plastic clay, and 3 to 15 parts by weight of carbon particles. When a specific surface area measured using a BET method is 60 m$^2$/g or larger and a density is 5.1 to 7.4 g/cc, it was shown that the yellow ocher-activated carbon composite particles have better VOC decomposition and deodorization effects than a molded body using only the yellow ocher, and maintain the purification performance longer than a purifier composed of only the activated carbon.

In the yellow ocher-activated carbon composite particles according to the present disclosure, many organic substances contained in the yellow ocher, such as the enzymes or the microorganisms, are present in a large amount on a surface and in the pores of the molded body, and the pollutants absorbed on a surface of the activated carbon are removed and/or decomposed, so that the air purification performance and the lifespan of the yellow ocher-activated carbon composite particles may be improved. In one example, in addition to the microorganisms of the above-mentioned names, microorganisms and other organic substances contained in the yellow ocher are included in the scope of the present disclosure. Yeasts, microorganisms, and the like present in the yellow ocher-activated carbon composite particles of the present disclosure may be easily detected using a method for culturing microorganisms of samples collected from the composite molded body.

The plastic clay prevents the yellow ocher from decomposing by water and further increases a viscosity of the yellow ocher, so that the yellow ocher-activated carbon composite particles may be molded to have an excellent strength through only the drying process without the calcination process. Further, it is preferable that, even when moisture is dried after being molded into a desired shape by adding water, the plastic clay is maintained in shape and strength at a time of molding. The plastic clay is, for example, one or at least two selected from a group consisting of bentonite, germanium, montmorillonite, and sericite. In this connection, it is preferable to use the bentonite or the montmorillonite.

Preferably, the plastic clay contains 71 to 73% by weight of silicon dioxide and 14 to 16% by weight of alumina as main components, and contains 11 to 15% by weight of at least two kinds of $Fe_2O_3$, titanium dioxide, magnesium oxide, calcium oxide, sodium oxide, or potassium oxide as trace components. Further, when a content of the plastic clay obtained in nature is less than the above content range, necessary components may be added.

The yellow ocher-activated carbon composite particles in the present disclosure may further contain 1 to 10 parts by weight of anion-emitting minerals, which may release anions to further improve antibacterial and odor particle removal performances. The anion-emitting minerals used in the present disclosure include at least two selected from a group consisting of $P_2O_5$, $Ce_2O_3$, $La_2O_3$, $Nd_2O_3$, $ThO_2$, $Pr_2O_3$, $SiO_2$, $Sm_2O_3$, $CaO$, $Fe_2O_3$, $TiO_2$, $ZrO_2$, $Y_2O_3$, $Gd_2O_3$, $Dy_2O_3$, and $SO_3$.

Optionally, the yellow ocher-activated carbon composite particles of the present disclosure may further contain chamotte. The chamotte is a material calcinated at about 1450° C. Further, when the chamotte is added, the chamotte may be used as a frame such that shapes of the yellow ocher-activated carbon composite particles may be maintained through only the drying process. The yellow ocher-activated carbon composite particles of the present disclosure may maintain the molded shapes thereof with only the plastic clay and the yellow ocher, but with the addition of the chamotte, the molded shapes thereof are maintained more rigidly. In this respect, 5 to 10 parts by weight of the chamotte with respect to 100 parts by weight of the yellow ocher may be contained. In this connection, the chamotte may preferably contain 50 to 60% by weight of silicon dioxide, 30 to 37% by weight of alumina, 1 to 5% by weight of $Fe_2O_3$, 1 to 5% by weight of titanium dioxide, 0.1 to 2.0% by weight of magnesium oxide, 0.01 to 0.1% by weight of calcium oxide, 0.01 to 0.1% by weight of sodium oxide, and 0.1 to 2.0% by weight of potassium oxide.

A method for manufacturing the yellow ocher-activated carbon composite particles 121 is as follows.

100 parts by weight of the yellow ocher, 5 to 15 parts by weight of the plastic clay, 3 to 15 parts by weight of the carbon particles are mixed with each other to form a yellow ocher-activated carbon mixture. Preferably, before the mixing, impurities of the plastic clay and the yellow ocher are removed through sieving and the like, and then each of the plastic clay and the yellow ocher is subjected to a grinding process such as a ball mill and the like to have a proper particle size. The particle size of each of the plastic clay and the yellow ocher is, for example, 150 to 250 mesh, preferably 180 to 230 mesh.

Next, the yellow ocher-carbon particle mixture is dehydrated. Further, the dehydration may be performed using a dehydration apparatus, or a vibrating body, a filter paper, and the like. The dehydrated yellow ocher-carbon particle mixture may be degassed by being kneaded using a vacuum pug mill, so that all bubbles in the mixed yellow ocher may be removed.

The dehydrated yellow ocher-carbon particle mixture is then molded into a particle shape using a particle shaper.

The molded yellow ocher-activated carbon composite particles are dried at 20 to 160° C. It is preferable that a drying time is sufficient such that the microorganisms and the like may be stably attached to the composite particles while the yellow ocher-activated carbon composite particles are dried.

An additional process of dipping the yellow ocher-activated carbon composite particles into mixed solution containing the microorganisms may be further included such that the microorganisms may be more contained in the yellow ocher-activated carbon composite particles.

Hereinafter, the present disclosure will be described in more detail with reference to the accompanying drawings.

Since the accompanying drawings are merely examples for describing the technical spirit of the present disclosure in more detail, the spirit of the present disclosure is not limited to the accompanying drawings.

FIG. 1 is an exploded perspective view of a multilayer film for air purification according to an embodiment of the present disclosure.

A multilayer film 10 for air purification of the present disclosure roughly includes three layers. The present disclosure is shown in an exploded perspective view as in FIG. 1 because at least two layers respectively have fine net structures, and layers are coupled with each other, and thus, it is difficult to show a coupled state in the drawing.

A first air permeable layer 110 and a second air permeable layer 130 which are located outward among the three layers include a lattice-shaped net structure, and are made of a polymer material, and thus are flexible. An average size of through holes in the lattice of each of the first air permeable layer 110 and the second air permeable layer 130 is preferably 0.1 to 0.5 mm. The first air permeable layer 110 and the second air permeable layer 130 have a function of confining and supporting the yellow ocher-activated carbon composite particles 121 in the multilayer film and a ventilation function of allowing the polluted air to pass through the multilayer film through the yellow ocher-activated carbon composite particles 121 for the air purification. Therefore, the average size of the through holes in the lattice of each of the first air permeable layer 110 and the second air permeable layer 130 is preferably smaller than an average size of the yellow ocher-activated carbon composite particles 121. It is preferable that an area occupied by the through holes in the lattice structure is large such that an area where the composite particles are in contact with air is large. The material of the first air permeable layer 110 and the second air permeable layer 130 is preferably a thermoplastic polymer to enable fusion. The most suitable material for ultrasonic fusion among the thermoplastic polymers is polyethylene, but it is not necessarily limited thereto. The first air permeable layer 110 and the second air permeable layer 130 are advantageously made of the same material having the same specification for a reason of a manufacturing process, but may be made of different materials or have different shapes in some cases.

An air purification particle layer 120 is disposed between the first air permeable layer 110 and the second air permeable layer 130. The air purification particle layer 120 contains the yellow ocher-activated carbon composite particles 121. Although not shown in FIG. 1, the particle layer 120 may not be included. However, when a particle support layer 122 is included, the particles may be more uniformly applied, and a coupling strength of the particles is increased, thereby improving durability of a product.

The yellow ocher-activated carbon composite particles 121 are preferably spherical. This is to maximize an air contact area for purification by having the largest specific surface area per unit volume, and to facilitate arrangement in the particle support layer 122. An average size (diameter) of the composite particles is preferably 0.5 to 3 mm. 1 to 2 mm is more preferable. Since the yellow ocher-activated carbon composite particles 121 are not subjected to the calcination process, it was difficult to mold the composite particles 121 to have the average size smaller than 0.5 mm, and even when the particles 121 are molded to have the average size smaller than 0.5 mm, a proper strength for functioning as a filter was not maintained. When the average size of the composite particles is greater than 3 mm, fusion of the layers was difficult, and a weight of the multilayer film for the air purification was greatly increased, which made it difficult to apply the composite particles 121 to a final application product. Considering a thickness of each layer and the size of the yellow ocher-activated carbon composite particles 121, a thickness of the multilayer film 10 for the air purification was 1 to 5 mm. This is because, considering the average size of the particles and the thickness of each layer film, it was difficult to make the composite particles 121 smaller than 1 mm due to a minimum limit of the particle average size, and when the composite particles 121 are formed to be too thick, the composite particles 121 is not suitable for the final application product or a flexibility thereof decreases.

The particle support layer 122 is preferably a thermoplastic polymer like the first air permeable layer 110 and the second air permeable layer 130, and includes a net structure having a lattice shape similar in shape. However, unlike the first air permeable layer 110 and the second air permeable layer 130, because the yellow ocher-activated carbon composite particles 121 must be located in particle receiving holes defined in the particle support layer, respectively, a size of the particle receiving holes, which are spaces in the lattice, should be slightly larger than the average size of the yellow ocher-activated carbon composite particles 121. Preferably, each particle receiving hole has the size enough for one particle to enter therein. Accordingly, the particle support layer 122 has a structure in which lattice spacings are large enough to allow the composite particles to pass through, unlike to the first air permeable layer 110 and the second air permeable layer 130. In the present disclosure, the film of each layer is described to have the lattice structure, but a plurality of perforated films having similar hole sizes may be used.

Figure 2:
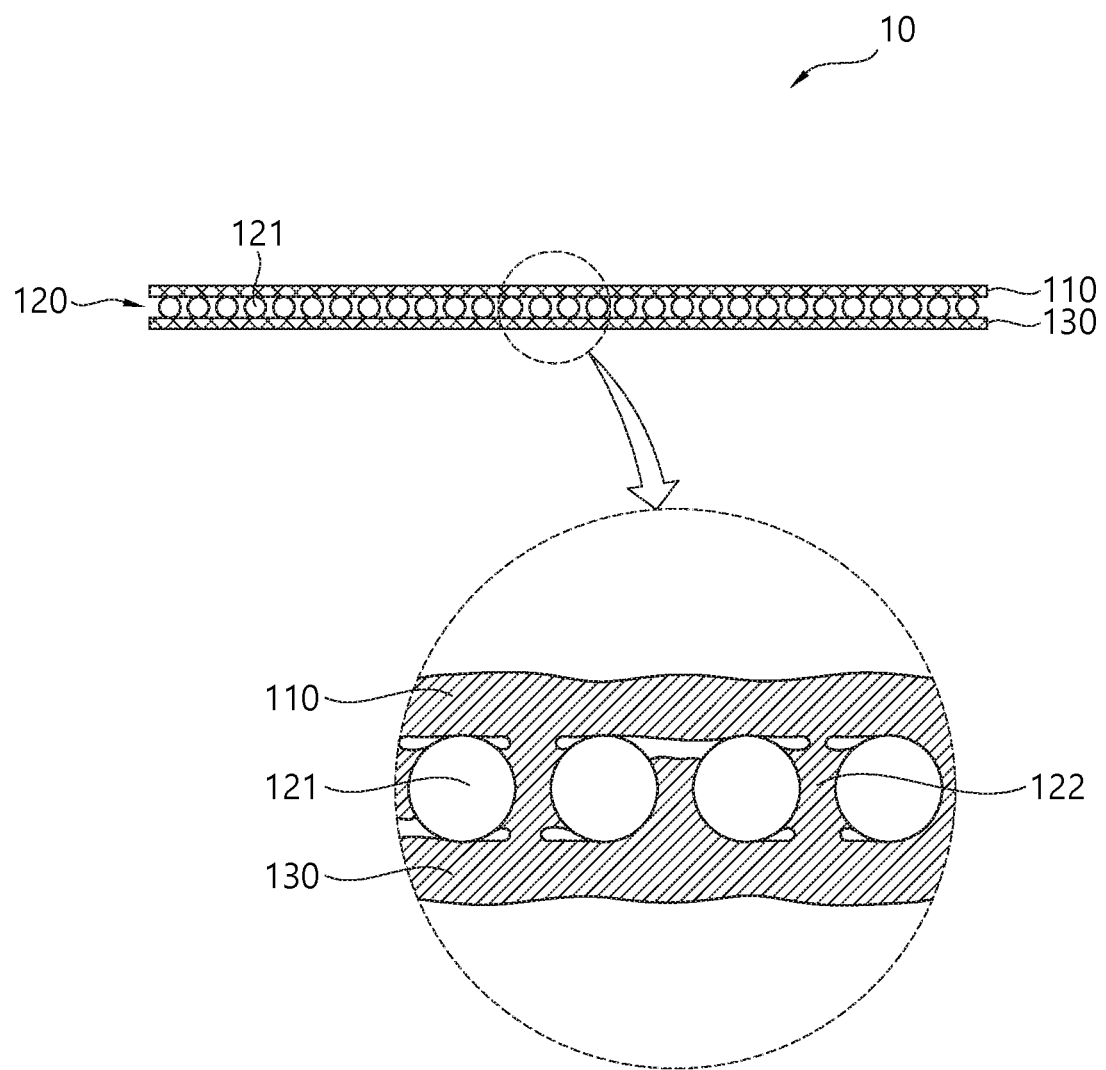
FIG. 2 is a vertical cross-sectional view of a multilayer film for air purification according to an embodiment of the present disclosure.

FIG. 2 is a vertical cross-sectional view of a multilayer film for air purification according to an embodiment of the present disclosure. The first air permeable layer 110 and the second air permeable layer 130 shown in the exploded perspective view of FIG. 1 include the air purification particle layer 120 therebetween, and the layers are coupled to each other using ultrasonic fusion or the like. Fusion may occur at portions where the first air permeable layer 110 and the second air permeable layer 130 come into contact with the particles. The first air permeable layer 110 and the second air permeable layer 130 may be fused in contact with the particle support layer 122. In an enlarged portion of FIG. 2, the first air permeable layer 110, the second air permeable layer 130, and the particle support layer 122 are all made of the same material. However, different materials may be used for the layers, which is not shown separately. In addition, each layer is substantially a lattice structure. Accordingly, each of the first air permeable layer 110 and the second air permeable layer 130 has a plurality of holes through which air may pass, and an average size of each hole is 0.1 to 0.5 mm.

Further, due to the limitations of representation on the drawing, the yellow ocher-activated carbon composite particles 121 and the particle support layer 122 may appear to be completely sealed with each other in the drawing, but are not sealed with each other at all. Further, since spherical particles are present in a rectangular lattice when viewed from the top, there is a space through which sufficient air may permeate at corners of each lattice. Therefore, the air introduced from one side of the multilayer film 10 for the air purification passes through the holes in the lattice structure formed in each layer. Particles larger than the holes are first filtered. Then, VOC particles or polluted particles respectively passing through the holes are adsorbed onto the surface of the yellow ocher-activated carbon composite particles 121 of the air purification particle layer 120, and decomposed by the microorganisms and the like in the yellow ocher.

In the present disclosure, the overall shape of the multilayer film 10 for the air purification is shown as a circular film, but is not limited thereto. The multilayer film 10 for the air purification may be manufactured and used based on size and shape of the product to be applied in the future, such as square, polygon, or the like.

A method for manufacturing the multilayer film 10 for the air purification according to the present disclosure is as follows. a) The first air permeable layer that has flexibility and has the net structure is prepared. b) The particle support layer having the net structure is disposed on the first air permeable layer. c) The composite particles are applied such that the yellow ocher-activated carbon composite particles are contained in at least some of the plurality of holes included in the net structure of the particle support layer. The particles may be arranged in multiple layers, but it is preferable to be arranged in a single layer if possible for future applications in other air purification products. d) The second air permeable layer having flexibility and having the net structure is covered on the composite particles. e) After disposing the second air permeable layer, at least portions of the first air permeable layer, the second air permeable layer, and the particle support layer are ultrasonically fused to each other.

It is preferable that all of the first air permeable layer 110, the second air permeable layer 130, and the particle support layer 122 are the thermoplastic polymers. This is to enable coupling between the layers and coupling between the particles and each layer, through the ultrasonic fusion. At the time of ultrasonic fusion, it is preferable that the fusion occurs only around a contact point between each layer and the particles, without greatly changing the lattice structure of each layer. When the fusion is performed for a long time, a coupling strength between the layers may become greater, but an area for blocking the surface of the composite particle becomes larger, and in severe cases, the air permeability may be impossible.

The yellow ocher-activated carbon composite particles containing 5 to 15 parts by weight of the plastic clay and 3 to 15 parts by weight of the activated carbon, based on 100 parts by weight of the yellow ocher, and having a density of 5.1 to 7.4 g/cc because of not being subjected to the calcination process are used. The calcination process results in higher density and higher strength, but all the yellow ocher-derived microorganisms disappear, thereby making it difficult to achieve the desired air purification effect.

Figure 3:
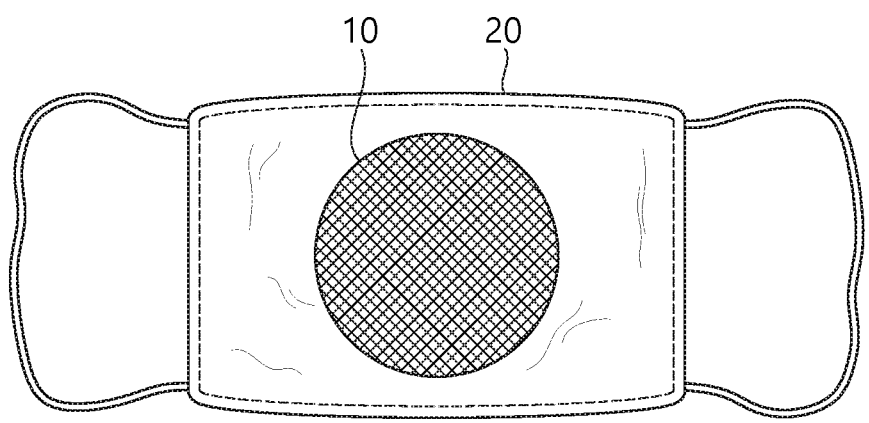
FIG. 3 shows a mask for air purification including a multilayer film for air purification according to an embodiment of the present disclosure.
Figure 4:
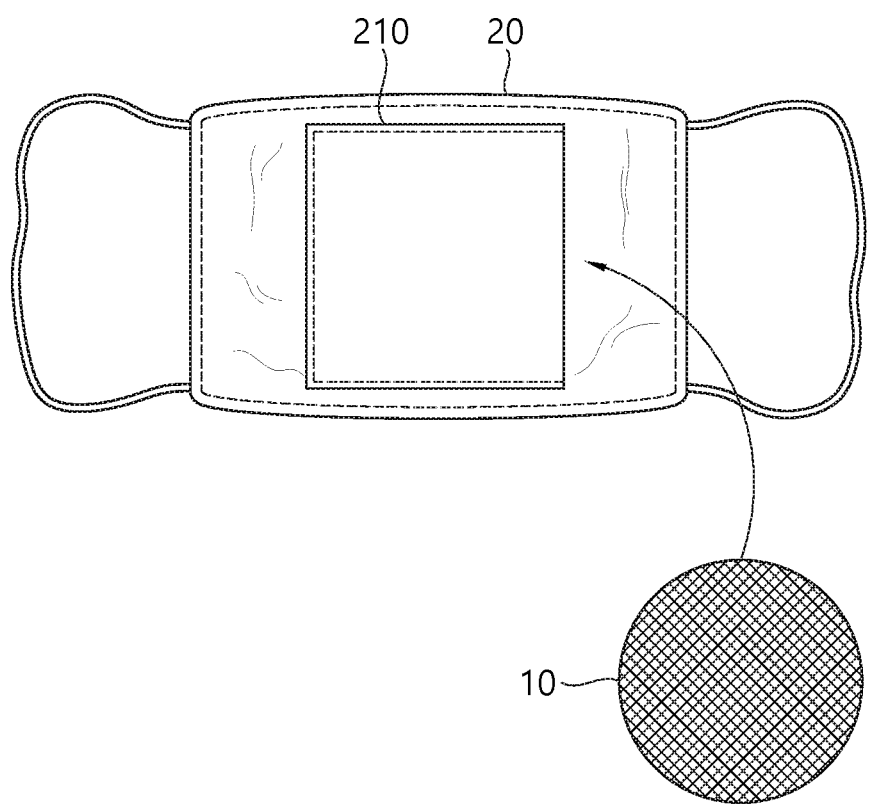
FIG. 4 shows a mask for air purification including a multilayer film for air purification according to another embodiment of the present disclosure.

FIGS. 3 and 4 show masks for air purification including multilayer films for air purification according to embodiments of the present disclosure, respectively. The multilayer film for the air purification of the present disclosure is flexible and has a relatively thin thickness of 1 to 5 mm. Therefore, the multilayer film for the air purification may be applied to a conventional cloth mask in a form or being coupled thereto. In addition, although not shown, means and the like to be hooked to an ear may be attached to the multilayer film 10 for the air purification of the present disclosure, and the multilayer film 10 may be used directly as a mask. As shown in FIG. 4, a pocket 210 may be formed on the cloth mask, and the multilayer film 10 for the air purification may be inserted into the pocket 210.

The yellow ocher-activated carbon composite particles 121 contained in the multilayer film 10 for the air purification of the present disclosure may be used for a long time. After 5 to 6 months of use, the composite particles 121 may be used repeatedly after being recycled in an unpolluted space for about 1 week. Therefore, as shown in FIG. 4, the composite particles 121 may be reused repeatedly and may be used to various types of masks by being attached and detached in the pocket form or using an adhesive, other detachable means, or the like.

The above embodiments are merely examples for describing the present disclosure, and the present disclosure is not limited thereto. The present disclosure may be variously modified and altered by those skilled in the art to which the present disclosure pertains, so that the scope of the present disclosure should be construed on the basis of the accompanying claims.

The invention claimed is:

1. A multilayer film for air purification, the multilayer film comprising:
   a first air permeable layer and a second air permeable layer, each having flexibility and having a net structure; and
   an air purification particle layer located between the first air permeable layer and the second air permeable layer, and containing yellow ocher-activated carbon composite particles having a larger average particle diameter than an average hole size of the first air permeable layer and the second air permeable layer,
   wherein at least portions of the first air permeable layer and the second air permeable layer are fused with each other.

2. A multilayer film for air purification, the multilayer film comprising:
   a first air permeable layer and a second air permeable layer, each having flexibility and having a net structure; and
   an air purification particle layer located between the first air permeable layer and the second air permeable layer, and containing yellow ocher-activated carbon composite particles having a larger average particle diameter than an average hole size of the first air permeable layer and the second air permeable layer,
   wherein the air purification particle layer further comprises a particle support layer having a plurality of particle receiving holes defined therein having a size larger than an average diameter of the yellow ocher-activated carbon composite particles,
   wherein at least some of the yellow ocher-activated carbon composite particles are located in the particle receiving holes and
   wherein at least one selected from the first air permeable layer and the second air permeable layer is at least partially fused to the particle support layer.

3. The multilayer film of claim 1, wherein at least one selected from the first air permeable layer and the second air permeable layer is made of a material containing a thermoplastic polymer.

4. The multilayer film of claim 1, wherein the yellow ocher-activated carbon composite particles contain 5 to 15 parts by weight of plastic clay and 3 to 15 parts by weight of activated carbon mixed with each other, based on 100 parts by weight of yellow ocher, and
   wherein the yellow ocher-activated carbon composite particles have a density of 5.1 to 7.4 g/cc because of not being subjected to a calcination process.

5. The multilayer film of claim 1, wherein an average thickness of the multilayer film for the air purification is 1 to 5 mm.

6. The multilayer film of claim 1, wherein at least some of the yellow ocher-activated carbon composite particles are attached to at least one selected from the first air permeable layer and the second air permeable layer.

7. The multilayer film of claim 1, wherein the thermoplastic polymer is polyethylene.

8. A method for manufacturing a multilayer film for air purification, the method comprising:
   preparing a first air permeable layer having flexibility and having a net structure;
   disposing a particle support layer having a net structure on the first air permeable layer;
   applying composite particles such that yellow ocher-activated carbon composite particles are contained in at least some of a plurality of holes included in the net structure of the particle support layer;

disposing a second air permeable layer having flexibility and having a net structure on the composite particles; and after disposing the second air permeable layer, ultrasonically fusing at least some of the first air permeable layer, the second air permeable layer, and the particle support layer with each other, wherein the yellow ocher-activated carbon composite particles contain 5 to 15 parts by weight of plastic clay and 3 to 15 parts by weight of activated carbon mixed with each other, based on 100 parts by weight of yellow ocher, and wherein the yellow ocher-activated carbon composite particles have a density of 5.1 to 7.4 g/cc because of not being subjected to a calcination process.

9. The method of claim 8, wherein at least one selected from the first air permeable layer, the second air permeable layer, and the particle support layer is made of a material containing a thermoplastic polymer.

10. A mask for air purification comprising the multilayer film for the air purification of claim 1.

\* \* \* \* \*